(12) United States Patent
Bauer et al.

(10) Patent No.: US 8,418,072 B1
(45) Date of Patent: *Apr. 9, 2013

(54) UI DATA MODEL ABSTRACTION

(75) Inventors: Andreas L. Bauer, Boxborough, MA (US); Brian Castelli, Fuquay-Varina, NC (US); James J. Glennon, Bellingham, MA (US); Mark A. Parenti, Milford, NH (US)

(73) Assignee: EMC Corporation, Hopkinton, MA (US)

( * ) Notice: Subject to any disclaimer, the term of this patent is extended or adjusted under 35 U.S.C. 154(b) by 1259 days.

This patent is subject to a terminal disclaimer.

(21) Appl. No.: 12/004,877

(22) Filed: Dec. 24, 2007

(51) Int. Cl.
*G06F 0/48* (2006.01)

(52) U.S. Cl. ........ 715/764; 715/707; 715/732; 715/866; 717/104; 709/223; 709/224; 709/225; 726/2; 726/3; 726/4; 726/5; 726/6; 710/36; 711/100; 711/101; 711/111; 711/112; 711/114

(58) Field of Classification Search .................... 715/764
See application file for complete search history.

(56) References Cited

U.S. PATENT DOCUMENTS

| | | | | |
|---|---|---|---|---|
| 5,734,837 A * | 3/1998 | Flores et al. | ................. | 705/7.13 |
| 6,009,466 A * | 12/1999 | Axberg et al. | ................. | 709/220 |
| 6,430,611 B1 * | 8/2002 | Kita et al. | ................. | 709/223 |
| 6,438,594 B1 * | 8/2002 | Bowman-Amuah | .......... | 709/225 |
| 6,519,571 B1 * | 2/2003 | Guheen et al. | ................. | 705/14.66 |
| 6,536,037 B1 * | 3/2003 | Guheen et al. | ................. | 717/151 |
| 6,687,787 B1 * | 2/2004 | Richardson et al. | ......... | 711/114 |
| 6,847,387 B2 * | 1/2005 | Roth | ............................. | 715/811 |
| 6,912,627 B2 * | 6/2005 | Matsunami et al. | ........... | 711/154 |
| 7,065,616 B2 * | 6/2006 | Gajjar et al. | ................. | 711/154 |
| 7,152,229 B2 * | 12/2006 | Chong et al. | .................. | 717/146 |
| 7,219,101 B2 * | 5/2007 | Dorsey | ................................ | 1/1 |
| 7,251,664 B2 * | 7/2007 | Fukuda et al. | ................. | 707/812 |
| 7,289,964 B1 * | 10/2007 | Bowman-Amuah | .......... | 705/1.1 |
| 7,367,028 B2 * | 4/2008 | Kodosky et al. | ............. | 717/177 |
| 7,430,722 B2 * | 9/2008 | Martin et al. | ................. | 715/762 |
| 7,490,167 B2 * | 2/2009 | Pena et al. | .................... | 709/246 |
| 7,523,231 B1 * | 4/2009 | Gupta et al. | .................... | 710/36 |
| 7,620,903 B1 * | 11/2009 | Rasmussen et al. | .......... | 715/762 |
| 7,634,567 B1 * | 12/2009 | Wood et al. | .................... | 709/226 |
| 7,640,342 B1 * | 12/2009 | Aharoni et al. | ............... | 709/226 |
| 7,680,901 B2 * | 3/2010 | Rechterman et al. | ......... | 709/219 |
| 7,730,259 B2 * | 6/2010 | Taguchi et al. | ............... | 711/114 |

(Continued)

OTHER PUBLICATIONS

Reza Nabi. "A service oriented crop profitability simulator realizing with web services", May 2010, available at [http://cis895.nabi.us], 147 pages.*

(Continued)

*Primary Examiner* — William Bashore
*Assistant Examiner* — Reza Nabi
(74) *Attorney, Agent, or Firm* — Muirhead and Saturnelli, LLC

(57) ABSTRACT

Described are techniques for performing a data storage management task. A presentation technology service layer renders a user interface for user interaction in accordance with one or more rendering techniques. A user interaction template service layer includes one or more templates. Each of the templates describes processing to perform the data storage management task. A user interface data model mapping service layer communicates with at least one of a business logic service layer and a data storage interface layer to perform one or more operations in connection with the data storage management task and to map data received therefrom in a form for use by the user interface in accordance with a user interface data model.

17 Claims, 11 Drawing Sheets

U.S. PATENT DOCUMENTS

| | | | |
|---|---|---|---|
| 7,900,186 B2 * | 3/2011 | Lucassen et al. | 717/104 |
| 7,937,323 B2 * | 5/2011 | Wagner et al. | 705/40 |
| 7,958,199 B2 * | 6/2011 | Ferrari et al. | 709/211 |
| 7,970,944 B2 * | 6/2011 | Pena et al. | 709/246 |
| 8,082,330 B1 * | 12/2011 | Castelli et al. | 709/220 |
| 8,095,764 B1 * | 1/2012 | Bauer et al. | 711/170 |
| 8,127,096 B1 * | 2/2012 | Chatterjee et al. | 711/162 |
| 8,151,077 B1 * | 4/2012 | Bauer et al. | 711/170 |
| 8,239,584 B1 * | 8/2012 | Rabe et al. | 710/8 |
| 2002/0133669 A1 * | 9/2002 | Devireddy et al. | 711/114 |
| 2003/0023953 A1 * | 1/2003 | Lucassen et al. | 717/106 |
| 2003/0046316 A1 * | 3/2003 | Gergic et al. | 707/513 |
| 2003/0172020 A1 * | 9/2003 | Davies et al. | 705/36 |
| 2003/0188291 A1 * | 10/2003 | Fisher | 717/102 |
| 2004/0002907 A1 * | 1/2004 | Tosswill | 705/34 |
| 2005/0226059 A1 * | 10/2005 | Kavuri et al. | 365/189.05 |
| 2007/0011650 A1 * | 1/2007 | Hage et al. | 717/104 |
| 2007/0103984 A1 * | 5/2007 | Kavuri et al. | 365/185.17 |
| 2007/0124374 A1 * | 5/2007 | Arun et al. | 709/204 |
| 2007/0192562 A1 * | 8/2007 | Yagi et al. | 711/170 |
| 2007/0220307 A1 * | 9/2007 | Ishii et al. | 714/5 |
| 2008/0104025 A1 * | 5/2008 | Dharamshi et al. | 707/3 |
| 2008/0109276 A1 * | 5/2008 | Ionfrida et al. | 705/7 |
| 2008/0109410 A1 * | 5/2008 | Berry et al. | 707/3 |
| 2008/0141174 A1 * | 6/2008 | Kodosky et al. | 715/835 |
| 2008/0147973 A1 * | 6/2008 | Gruttadauria et al. | 711/114 |
| 2008/0183674 A1 * | 7/2008 | Bush et al. | 707/3 |
| 2008/0263462 A1 * | 10/2008 | Mayer-Ullmann et al. | 715/762 |
| 2009/0132537 A1 * | 5/2009 | Denton | 707/9 |
| 2009/0300060 A1 * | 12/2009 | Beringer et al. | 707/103 R |
| 2011/0016283 A1 * | 1/2011 | Davis et al. | 711/170 |
| 2011/0088011 A1 * | 4/2011 | Ouali | 717/105 |
| 2012/0011284 A1 * | 1/2012 | Filali-Adib et al. | 710/8 |
| 2012/0304250 A1 * | 11/2012 | Hu et al. | 726/1 |

OTHER PUBLICATIONS

U.S. Appl. No. 11/824,578, Gupta et al.

* cited by examiner

UI DATA MODEL ABSTRACTION

BACKGROUND

1. Technical Field

This application generally relates to data storage, and more particularly to techniques used for data storage configuration.

2. Description of Related Art

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems may be coupled to one or more servers or host processors and provide storage services to each host processor. Multiple data storage systems from one or more different vendors may be connected and may provide common data storage for one or more host processors in a computer system.

A host processor may perform a variety of data processing tasks and operations using the data storage system. For example, a host processor may perform basic system I/O operations in connection with data requests, such as data read and write operations.

Host processor systems may store and retrieve data using a storage device containing a plurality of host interface units, disk drives, and disk interface units. The host systems access the storage device through a plurality of channels provided therewith. Host systems provide data and access control information through the channels to the storage device and the storage device provides data to the host systems also through the channels. The host systems do not address the disk drives of the storage device directly, but rather, access what appears to the host systems as a plurality of logical disk units. The logical disk units may or may not correspond to the actual disk drives. Allowing multiple host systems to access the single storage device unit allows the host systems to share data in the device. In order to facilitate sharing of the data on the device, additional software on the data storage systems may also be used.

Different tasks may be performed in connection with a data storage system. For example, a customer may perform data storage management tasks and operations such as viewing information regarding a status or current configuration, configuring and provisioning data storage for use with an application as may reside on a host system, and the like. Data storage management software may be developed for use in performing the foregoing and other data storage management tasks and operations. The software may be written to take into account one or more data models. A first data model may be a low-level data model associated with the underlying data storage system. The foregoing first data model may not include elements which are appropriate for direct use or consumption by a user interface. As such, the software may be developed to utilize the first data model and place it in a form appropriate for user interactions. Depending how the software is designed, changes to an underlying low-level data model may require modification of many code modules including those associated with the user interface. In connection with the foregoing, it may be desirable that the software is designed in a manner which seeks to minimize the code modifications required. Additionally, a new technology may be used in connection with implementation of the user interface. It may be desirable to use existing code currently deployed with other technologies with the new technology. Furthermore, a user interface may be used in connection with different data storage systems each having a different low-level data model. It may be desirable to utilize a common set of user interface modules with each of the different low-level data models. Thus, it may be desirable to use techniques in connection with the development of the software for data storage management which promotes efficiency by modular design and code reuse.

SUMMARY OF THE INVENTION

In accordance with one aspect of the invention is a system including a computer readable medium with executable code stored thereon for performing a data storage management task, the computer readable medium comprising executable code for: a presentation technology service layer that renders a user interface for user interaction in accordance with one or more rendering techniques; a user interaction template service layer that includes one or more templates, each of said templates describing processing to perform said data storage management task; and a user interface data model mapping service layer which communicates with at least one of a business logic service layer and a data storage interface layer to perform one or more operations in connection with said data storage management task and map data received therefrom in a form for use by said user interface in accordance with a user interface data model. Each of said templates may include one or more user-specified inputs, one or more outputs rendered by one of said rendering techniques, and may outline one or more logical steps to perform said data storage management task. Each of the one or more logical steps may correspond to a user interaction and an ordering associated with performing the one or more logical steps may define an ordering in which user interactions associated with the logical steps are performed. The user interaction template service layer may include calls to code in said presentation technology service layer to render data for display in a user interface, and wherein said user interaction template service layer may include calls to code in said user interface data model mapping service layer. The user interaction template service layer may include at least one call to code in said user interface data model mapping service layer to perform processing or retrieve data in connection with said data storage management task. The data storage interface layer may use a data storage data model and said business logic service layer may map data elements from data storage data model to an application and best practices data model. The business logic service layer may perform mapping of one or more data elements from said data storage data model to another data element in said application and best practices model to perform said data storage management task in accordance with best practices associated with a particular application and data storage system upon which data is hosted for said particular application. The business logic service layer may include an application-specific data element which is associated with storage hosted on a data storage system for a particular type of application. The application-specific data element may be a data object or a property of a data object associated with storage hosted on said data storage system for only a first application of a plurality of applications for which storage is hosted on the data storage system. The business logic service layer may include an application-neutral data element which is associated storage for each of a plurality of applications for which storage is hosted on a data storage system. The application-neutral data element may be a data object or a property of a data object associated with storage hosted on said data storage system for each of a plurality of applications for which storage is hosted on the data storage system. The user interface data model mapping service layer may generate a data set in accordance with said user interface data model which varies in accordance with a user proficiency level at which said user interactions are performed. The data storage management task may be to display a data set of information. The presentation technology service layer may include code for rendering said data set in accordance with at least two different rendering techniques. The user interaction template service layer may include a template for displaying the set of information. The template may be used in connection with rendering said data set in connection with said user interface for each of said two different rendering techniques. The user interface data model mapping service layer may communicate with said business logic service layer to retrieve said data set if user interactions are in accordance with a first proficiency level, and said user interface data model mapping service layer may communicate directly with said data storage interface layer to retrieve said data set if user interactions are in accordance with a second proficiency level, wherein said second proficiency level is associated with a higher degree of knowledge regarding data storage system management than said first proficiency level. The presentation technology service layer and said user interaction template service layer may be included in a workstation and the user interface data model mapping service layer and the data storage interface layer may be included in a data storage system with the workstation communicating directly with the managed device. The presentation technology service layer and said user interaction template service layer may be included in workstation and said user interface data model mapping service layer may be included in a management server and said data storage interface layer may be included in a data storage system, said workstation communicating directly with said management server, and management server communicating directly with said data storage system and one or more other managed devices each including another instance of said data storage interface layer. The presentation technology service layer, said user interaction template service layer, and said user interface data model mapping service layer may be included in a workstation and said data storage interface layer may be included in a data storage system, said workstation communicating directly with said data storage system. The presentation technology service layer may be included in a workstation, and said user interaction template service layer, said user interface data model mapping service layer and data storage interface layer may be included in a data storage system, said workstation communicating directly with said data storage system.

In accordance with another aspect of the invention is a computer-implemented method for performing a data storage management task comprising: executing first code included in a presentation technology service layer that renders a user interface for user interaction in accordance with one or more rendering techniques; executing second code included in a user interaction template service layer that includes one or more templates, each of said templates describing processing to perform said data storage management task; and executing third code included in a user interface data model mapping service layer which communicates with at least one of a business logic service layer and a data storage interface layer to perform one or more operations in connection with said data storage management task and map data received therefrom in a form for use by said user interface in accordance with a user interface data model. Each of said templates may include one or more user-specified inputs, one or more outputs rendered by one of said rendering techniques, and may outlines one or more logical steps to perform said data storage management task, and wherein each of the one or more logical steps may correspond to a user interaction and an ordering associated with performing the one or more logical steps defines an ordering in which user interactions associated with the logical steps are performed.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF EMBODIMENT(S)

Figure 1:
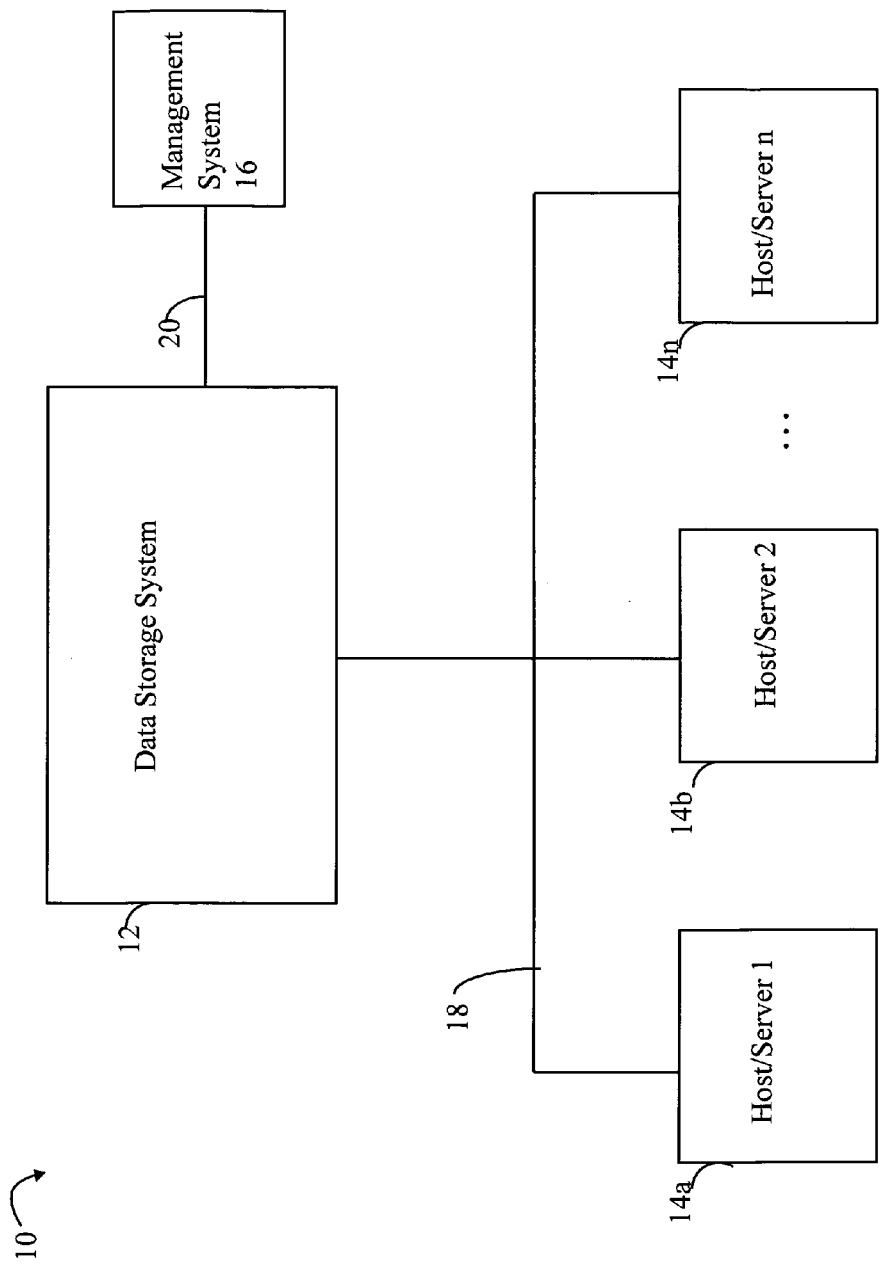
FIG. 1 is an example of an embodiment of a computer system that may utilize the techniques described herein.

Referring to FIG. 1, shown is an example of an embodiment of a computer system that may be used in connection with performing the techniques described herein. The computer system 10 includes one or more data storage systems 12 connected to server or host systems 14a-14n through communication medium 18. The system 10 also includes a management system 16 connected to one or more data storage systems 12 through communication medium 20. In this embodiment of the computer system 10, the management system 16, and the N servers or hosts 14a-14n may access the data storage systems 12, for example, in performing input/output (I/O) operations, data requests, and other operations. The communication medium 18 may be any one or more of a variety of networks or other type of communication connections as known to those skilled in the art. Each of the communication mediums 18 and 20 may be a network connection, bus, and/or other type of data link, such as a hardwire or other connections known in the art. For example, the communication medium 18 may be the Internet, an intranet, network or other wireless or other hardwired connection(s) by which the host systems 14a-14n may access and communicate with the data storage systems 12, and may also communicate with other components (not shown) that may be included in the computer system 10. In one embodiment, the communication medium 20 may be a LAN connection and the communication medium 18 may be an iSCSI or fibre channel connection.

Each of the host systems 14a-14n and the data storage systems 12 included in the computer system 10 may be connected to the communication medium 18 by any one of a variety of connections as may be provided and supported in accordance with the type of communication medium 18. Similarly, the management system 16 may be connected to the communication medium 20 by any one of variety of connections in accordance with the type of communication medium 20. The processors included in the host computer systems 14a-14n and management system 16 may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage systems 12 are described herein in more detail, and may vary with each particular embodiment. Each of the host computers 14a-14n, the management system 16 and data storage systems may all be located at the same physical site, or, alternatively, may also be located in different physical locations. In connection with communication mediums 18 and 20, a variety of different communication protocols may be used such as SCSI, Fibre Channel, iSCSI, and the like. Some or all of the connections by which the hosts, management system, and data storage system may be connected to their respective communication medium may pass through other communication devices, such as a Connectrix or other switching equipment that may exist such as a phone line, a repeater, a multiplexer or even a satellite. In one embodiment, the hosts may communicate with the data storage systems over an iSCSI or a Fibre Channel connection and the management system may communicate with the data storage systems over a separate network connection using TCP/IP. It should be noted that although FIG. 1 illustrates communications between the hosts and data storage systems being over a first connection, and communications between the management system and the data storage systems being over a second different connection, an embodiment may also use the same connection. The particular type and number of connections may vary in accordance with particulars of each embodiment.

Each of the host computer systems may perform different types of data operations in accordance with different types of tasks. In the embodiment of FIG. 1, any one of the host computers 14a-14n may issue a data request to the data storage systems 12 to perform a data operation. For example, an application executing on one of the host computers 14a-14n may perform a read or write operation resulting in one or more data requests to the data storage systems 12.

The management system 16 may be used in connection with management of the data storage systems 12. The management system 16 may include hardware and/or software components. The management system 16 may include one or more computer processors connected to one or more I/O devices such as, for example, a display or other output device, and an input device such as, for example, a keyboard, mouse, and the like. A data storage system manager may, for example, view information about a current storage volume configuration on a display device of the management system 16, provision data storage system resources, and the like.

In one embodiment, the one or more data storage systems 12 of FIG. 1 may be an appliance with hardware and software for hosting the data storage of the one or more applications executing on the hosts 14a-14n. The appliance may include one or more storage processors and one or more devices upon which data is stored. The appliance may include software used in connection with storing the data of the hosts on the appliance and also software used in connection with performing other data storage management tasks and operations in connection with the techniques herein such as, for example, performing monitoring operations (e.g., monitor device or configuration status), configuring the data storage for use by the hosts, and the like. Described in following paragraphs are techniques that may be used in connection with an architecture or framework. Software used in performing data storage management tasks and operations may be developed in accordance with the architecture described herein.

In connection with an embodiment in which the data storage 12 is an appliance including hardware and software, the appliance may also include other software for performing different data services. For example, the appliance may include backup server software which interacts with software on the hosts 14a-14n when performing a backup operation.

In another embodiment, the data storage systems 12 may include one or more data storage systems such as one or more of the data storage systems offered by EMC Corporation of Hopkinton, Mass. Each of the data storage systems may include one or more data storage devices, such as disks. One or more data storage systems may be manufactured by one or more different vendors. Each of the data storage systems included in 12 may be inter-connected (not shown). Additionally, the data storage systems may also be connected to the host systems through any one or more communication connections that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage systems 12. It should be noted that each of the data storage systems may operate stand-alone, or may also be included as part of a storage area network (SAN) that includes, for example, other components such as other data storage systems. Each of the data storage systems may include a plurality of disk devices or volumes. The particular data storage systems and examples as described herein for purposes of illustration should not be construed as a limitation. Other types of commercially available data storage systems, as well as processors and hardware controlling access to these particular devices, may also be included in an embodiment.

In such an embodiment in which element 12 of FIG. 1 is implemented using one or more data storage systems, each of the data storage systems may include code thereon for performing the techniques as described herein for performing a data storage management operation or task.

Servers or host systems, such as 14a-14n, provide data and access control information through channels to the storage systems, and the storage systems may also provide data to the host systems also through the channels. The host systems may not address the disk drives of the storage systems directly, but rather access to data may be provided to one or more host systems from what the host systems view as a plurality of logical devices or logical volumes (LVs). The LVs may or may not correspond to the actual disk drives. For example, one or more LVs may reside on a single physical disk drive. Data in a single storage system may be accessed by multiple hosts allowing the hosts to share the data residing therein. An LV or LUN (logical unit number) may be used to refer to the foregoing logically defined devices or volumes.

In following paragraphs, reference may be made to a particular embodiment or features thereof. For example, one embodiment may implement element 12 of FIG. 1 an appliance as described above. However, it will be appreciated by those skilled in the art that this is for purposes of illustration and should not be construed as a limitation of the techniques herein.

Described in following paragraphs are techniques that may be used to create code modules included in different service layers of an application or system for performing data storage management operations. The techniques described herein may be used to develop software having a user interface with a first data model. The software may also interface with the lower level data storage system having a second data model. Additionally, the software may also be developed to include best practices as well as application-specific and application-dependent concepts in accordance with a third data model. In accordance with the techniques herein, the software may perform a translation or mapping between the different data models. By partitioning the foregoing data models and mapping into different service layers, many advantages may be provided including increased code reuse. The techniques herein describe a way to implement a management software stack that decouples the user interface technology and user interactions from other underlying layers providing for a modular design. The techniques herein set forth an implementation approach in accordance with an architecture that may be used in designing and developing software. The architecture described in following paragraphs defines a modularized structure or framework including different service layers allowing different software modules at different layers to be used together in a variety of different ways. Using the techniques herein, a system of code modules may be developed which can interact with one another in a variety of different ways to perform a data storage management system task.

In connection with the techniques herein, the user interface (UI) data model and supporting components may be logically separated from other layers.

Figure 2:
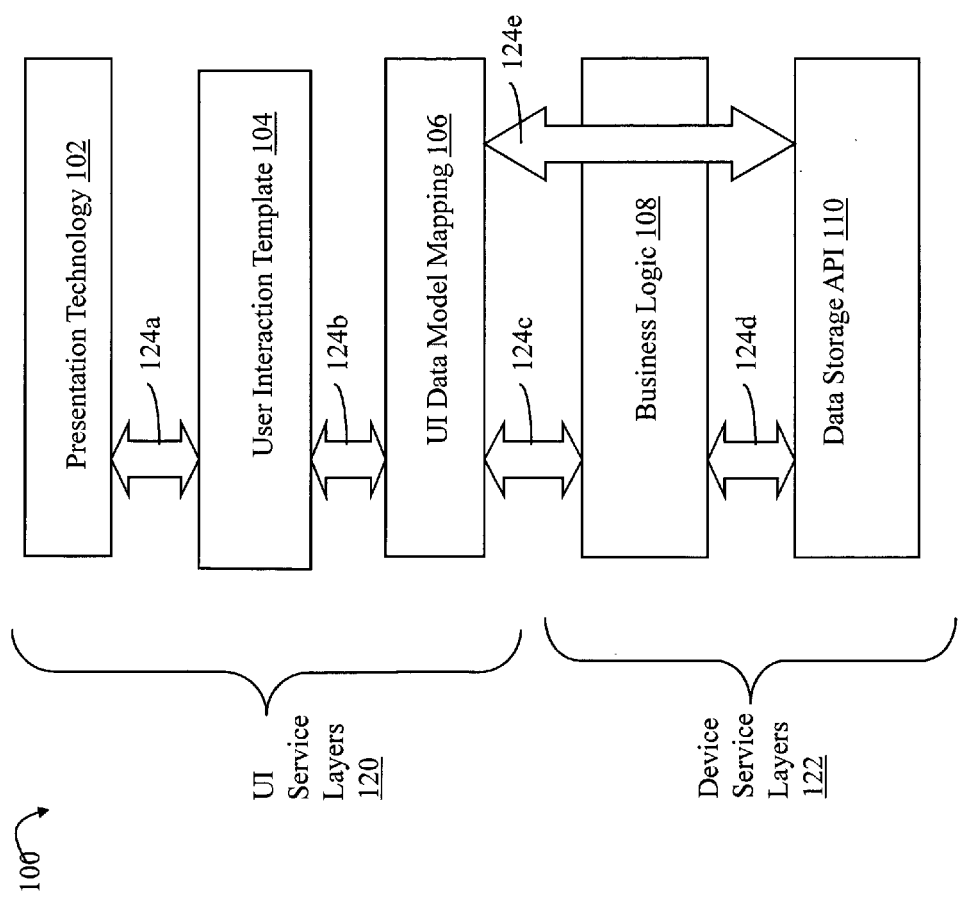
FIG. 2 is an example illustrating the different service layers that may be included in an embodiment using the techniques herein.

Referring to FIG. 2, shown is an example illustrating the different service layers that may be used in connection with the techniques herein. The example 100 includes 5 service layers that may be embodied in a system implementing data storage system management operations and tasks. The example 100 includes UI service layers 120 and device service layers 122. The UI service layers 120 may include the following service layers: presentation technology 102, user interaction template 104, and UI data model mapping 106. The device service layers 122 may include the following service layers: business logic 109 and data storage API (Application programming interface) 110. Each of the foregoing will now be described in more detail.

Each service layer may include one or more code modules used in connection with implementing particular data storage system management operations as will be described in following paragraphs.

Each of the service layers of the example 100 may be characterized as remotable in that they may be located on one or more different components in different combinations. Some example implementations are described elsewhere herein. One or more of the service layers may be located on different components having connectivity so that the API calls between service layers may be remote API calls as well as local API calls when service layers are on the same component.

The UI service layers 120 may be characterized as those layers associated with implementation of the user interface including user interactions and also mapping data elements from other layers to a UI data model. The presentation technology service layer 102 represents the different implementation technologies that may be used in an embodiment in connection with presenting the UI to a user. In other words, layer 102 represents the one or more technologies that may be used in generate the GUI widgets, wizards, menus, buttons, dialogue boxes, command line interfaces, and the like. The layer 102 separates the underlying UI implementation technology from the other logically partitioned layers and associated functionalities. As an example, implementation technologies that may be supported by code modules of the presentation technology service layer 102 include HTML, Java applet running in a web browser, a technology such as Nexweb which uses graphics or drawing commands with a rendering engine, AJAX (Asynchronous Javascript And XML), Adobe® Flash™ or Adobe® Flex™, as well as a Windows-based application written in any one or more different programming languages used to render the UI.

The user interaction template service layer 104 may be characterized as encapsulating a problem analysis or task definition from the UI perspective. When performing a data storage system management task from the UI perspective, different elements may be determined including: the data flow or logical steps to achieve the task, data and processing dependencies affecting a processing order, and the inputs and outputs with respect to user interaction and when interacting with other service layers. In connection with the logical steps, the steps may be defined to obtain the necessary user inputs, perform any processing, and describe the different logical steps that may be taken depending on one or more inputs and/or outputs. As an example, a data storage management task may be to provision storage for use with an application. A software wizard or series of dialogue boxes may be implemented to perform the foregoing. The user may be required to provide inputs including a name of a server or host system, an application running on the host for which this provisioning task is being performed, and an amount of storage to allocate. The foregoing may be achieved via user interaction and may be implemented in any one of the different supported presentation technologies of the service layer 102. Analyzing a task and defining a series of logical processing steps to complete the task may be used to drive the UI development and behavior such as, for example, an order in which different menus or dialogue boxes are displayed to a user, the content of each menu or dialogue box, and the like. The user interaction template service layer 104 may include a template for each task. The template may be expressed using a language, set of rules, and the like, defining the logical processing steps, data flow and interactions between the user and other service layers. In other words, the template may define processing steps including calls to the presentation technology service layer 102 and UI data model mapping layer 106 to perform the task. The same template may be reused with different implementation technologies.

In connection with interacting with the data storage system to perform management tasks, a user may elect to interact in accordance with a selected proficiency level. Each level of user proficiency may provide a different level of detail or abstraction with respect to the underlying operations and tasks performed on the data storage system in accordance with a level of user sophistication and knowledge. The language or terminology appearing in the UI with user interactions, the UI data (e.g., content or data used to populate the UI menus), and UI presentation or structure (e.g., commands presented or particular hierarchical menu structure) may vary in accordance with the particular level of proficiency with which the user interacts when performing the task. Thus, a user may interact with the data storage system at a variety of different user proficiency levels when issuing data storage configuration requests and when performing other tasks for the same application. The UI may be customized for the particular level and application for which the request is performed.

An embodiment may also consider a user proficiency level in connection with the UI interactions and when defining the user interaction templates of layer 104. An embodiment may vary the user inputs and/or outputs as well as the logical flow from the UI perspective in accordance with a user proficiency level. As such, a different template, or variations of a template, may be expressed for the different supported user proficiency levels. As an example, the data storage system and device properties included in user inputs and/or outputs may vary with the user proficiency level. For example, if a task is a monitoring task to display information regarding LUNs on a data storage system, low-level details such as RAID-level data protection, may not be provided to a NOVICE proficiency level user. However, such RAID-level data protection information may be provided to an ADVANCED proficiency level user. In a case where a RAID level provides for data protection in the event of a disk failure, a more general description such as "protected" or "replicated" may be displayed to the NOVICE user; whereas an actual RAID level N may be output in connection with the ADVANCED user. Different user levels of proficiency in connection with data storage system management tasks are described in more detail in U.S. patent application Ser. No. 11/824,578, Filed Jun. 29, 2007, APPLICATION AWARE STORAGE, which is incorporated by reference herein.

In connection with the template service layer 104, consider a data storage management task to display the LUN information in a table format. A user selection from a menu may be made commencing processing to perform this task. In response to the user selection, different information may be collected for each LUN which is aggregated into a table format for display to the user. The table may include, for example, a row for each LUN and associated LUN information. For the sake of illustration, the information displayed per LUN may include LUN name or number, LUN capacity, status and indicate which application(s) have storage provisioned on the LUN. If the user is a NOVICE, the LUN information may include an indicator, such as "protected" or "not protected" in accordance with the underlying RAID type for the LUN. If the user is ADVANCED, the RAID level may be displayed rather than the foregoing indicator. In an embodiment, the user interaction template for performing the foregoing task of displaying a table of information may include the following:

Input: user selection of information to be included in table
Output: Data set used as to populate table
Logic: Get (user selection, menu data)
   Get data set (in=user selection, out=data set)
   Output (data set)

where the Input and Output represent the inputs and outputs with respect to the user interaction for this task. The Logic may be a series of logical processing steps expressed in a language, set of rules, and/or other technique that may be used in an embodiment to encapsulate the logical processing and flow. In this example, each line in the foregoing Logic section may be a call to a routine in another service layer. Get (user selection, menu data) may be a call to the presentation technology service layer 102 to display a menu of items including the "menu data" options from which the user makes a "user selection" which is returned. The "menu data" may have also provided the user with other possible selections for which a data set may be displayed. Get data set (in=user selection, out=data set) may be a call to the UI data model mapping service layer 106 to obtain a "data set" in accordance with the "user selection". Service layers 106, 108 and 110 are described in more detail below. Output (data set) may be call to the presentation technology service layer 102 to output the data set. The same template as described above may be used with different presentation technologies supported by layer 102. The code implementing each call to service layer 102 may vary in accordance with the underlying supported technology. In an embodiment in which multiple technologies are included in 102, a parameter in the call, configuration setting, or other means may be used to select or indicate a particular technology.

Processing of the foregoing Logic may result in one or more menus being displayed to a user. In connection with a menu displayed for the first Logic step, a user selection is made from the menu indicating the type of information to be presented, such as LUN information described above. In connection with the second Logic step described above, processing is performed by the layers in the example 100 to collect the information in accordance with the user selection and place the information in a data set format for display as a table to the user. The data set contents and format may be in accordance with a user interface data model. The UI data model mapping layer 106 may perform processing to collect information by making one or more calls to lower service layers 108 and 110. With respect to the example in which a user has selected to display LUN information, the mapping service layer 106 may perform one or more calls to layers 108 and/or 110 for each LUN to obtain the necessary properties for each LUN. The layer 106 may aggregate the collected data and perform any additional processing to place it in a form in accordance with a UI data model for display. The additional processing may include, for example, combining one or more pieces of data collected, selecting for display only a portion of the collected data, and placing the data in a format in accordance with the selection. For example, the format may be a table format include a row of information per LUN. The additional processing may also include converting raw values or data as returned from layer 108 and/or 110 into a form appropriate for display to a user. As an example, a lower layer 108 and/or 110 may return a numeric value such as 0.04. Layer 106 may convert the value 0.04 to an integer value of "4" which is a percentage for display. The layer 106 may also perform conversions or mapping of received data from layers 108 and/or 110 in accordance with the user proficiency level as described above and elsewhere herein.

It should be noted that the language used to express a template of layer 104 for a task may include a variety of different features varying from what is described herein. The language may include support for conditional statements and processing (e.g., IF THEN ELSE, CASE statements), complex expressions and operators used to form the conditionals or perform processing, and the like.

In connection with the example 100, it should be noted that the mapping service layer 106 may interact directly with the business logic service layer 108 and/or the data storage API service layer 110. An embodiment may optionally include or not include layer 108 as described in more detail below. Prior to describing layer 108, layer 110 is described.

The data storage API service layer 110 may be characterized as an interface between the underlying devices or data storage system. Layer 110 may be an industry or other standard providing a common interface with data storage data model for use with different underlying data storage systems such as by different vendors. Use of the layer 110 may promote interoperability between different underlying data storage system implementations. Thus, code of the layers 106 and/or 108 may use a same API when interacting with different data storage systems. As an example, the data storage API service layer 110 may be implemented in accordance with the SMI-S (Storage Management Initiative Specification) which is based on existing standards such as the Common Information Model (CIM) (e.g., describing management requirements and capabilities of systems) and Web-Based Enterprise Management (WBEM). In connection with the previous example of obtaining information for inclusion in a LUN information table for display, the mapping service layer 106 may access multiple data objects defined in accordance with SMI-S and also traverse relationships therebetween to obtain the desired LUN properties. The mapping layer 106 may interact directly with 110 and performing mapping from the data storage data model to the UI data model.

As a further example illustrating use of the data storage API 110, an embodiment may support performing tasks as described herein for multiple data storage systems of different types by a same vendor, and also one or more data storage systems of different data storage vendors. An embodiment may provide support for use with several different data storage systems by a first vendor, such as the Symmetrix® data storage system and the CLARiiON® data storage system by EMC Corporation. The embodiment may also provide support for a third type of data storage system by a different data storage vendor. Each of the foregoing data storage systems by EMC Corporation (e.g., the Symmetrix® data storage system and the CLARiiON® data storage) and the third type of data storage system by the different vendor may have a different underlying data storage system-specific data model, use different switches, commands, command options, and the like, in connection with implementing a same task. Each of the data storage system-specific data models, commands, command options, and the like, may be mapped to a common data model, common set of properties or attributes, common set of operations, and the like, which are exposed through a common API of the Data Storage API 110. Thus, other layers, such as 106 and 108, may interact with the different supported underlying data storage systems to perform a same task using a common API of 110.

The business logic service layer 108 may be characterized as a layer adding business value between the raw underlying layer 110 and the upper layers 102, 104 and 106. The layer 108 may be used in connection with an application and/or best practices data model to encapsulate business-related semantics on top of the underlying data storage system data model. The layer 108 may be used to map entities in the data storage model of 110 to other entities in accordance with best practices. The layer 108 may be used to introduce application-specific objects and/or properties as well as application-neutral objects and/or properties. As an example, additional information on LUNs used to host data in connection with an email application, such as Microsoft® Exchange™, may be included in the table of LUN information. The layer 108 may encapsulate the concept of an application-dependent class of LUN for LUNs hosting data thereon for Microsoft® Exchange™. Such an application dependent class may be EXCHANGE LUN which includes a DATABASE LUN and a LOG LUN since a LUN in connection with Microsoft® Exchange™ may be, respectively, used for storing data (database LUN) or logging (log LUN). Other application dependent classes of objects may also be encapsulated within the layer 108. Layer 108 may provide mapping from the data storage model used in 110 to entities (e.g., objects and properties or attributes) in the application and best practices model. As an example, LUN 1, LUN2 and LUN 3 may be used by Microsoft® Exchange™. In an embodiment in which layer 106 directly calls layer 110 without going through 108 to obtain LUN information, the additional information regarding whether a LUN is a DATABASE or LOG LUN may not be provided in the table displayed to the user for those LUNs hosting storage for Microsoft® Exchange™. Rather, the foregoing LUN properties of DATABASE LUN or LOG LUN may be provided when the layer 106 makes a first call to layer 108. In response, layer 108 may issue one or more calls to layer 110 to obtain the information requested for a LUN. Using one or more properties extracted from layer 110, the layer 108 may make a determination as to whether a LUN is used for Microsoft® Exchange™ and whether the LUN is further a DATABASE or LOG LUN. When the layer 106 interacts with layer 108, the layer 106 may performing mapping of the application and best practices data model to the UI data model.

The best practices encapsulated in layer 108 may be customized for a particular application and the particular data storage system and environment. In other words, the best practices may vary in accordance with the particular application as well as the underlying data storage system and environment. For example, different practices may be preferred for a same application as the underlying data storage system changes. Best practices may relate to the settings or options selected when performing a task such as provisioning data storage for an application. Examples illustrating best practices which are application specific as well as application neutral are described herein.

As an example of best practices, the layer 108 may perform mapping which is application-specific for a LUN property. The mapping may also be determined in accordance with what are the best practices for the underlying data storage system device that may vary per vendor. As an example, a LUN may have the data thereon "protected" so that, in the event of a device failure, the data may be recovered or is otherwise duplicated. The way in which data protection is best implemented for LUNs hosting data for an email application may differ from LUNs hosting data for a database, such as SQL. Furthermore, it may also vary with the underlying data storage system vendor and/or device. For example, different RAID levels may be selected for each of the foregoing email application and database. Furthermore, in connection with LUNs hosting data for the email application, a different RAID level may be selected for use with DATABASE LUNs than with LOG LUNs. The foregoing may be used to define a LUN property regarding whether there is any data protection for the LUN. The LUN property may have a value of "PROTECTED" or "NOT PROTECTED" which is included in the displayed table of LUN information. The particular way in which data protection is implemented may vary with application and data storage system. "REDUNDANT" may be another LUN property used to expose a LUN property which has a RAID 5 OR RAID 1 property. "NOT REDUNDANT" may be used to expose a LUN property, for example, which has RAID 0 (e.g., striping). Whether RAID 1, RAID 5, or RAID0 is selected may vary with best practices for a particular application and/or data storage vendor. For a NOVICE user proficiency level, the more abstract property values of PROTECTED/NOT PROTECTED and REDUNDANT/NOT REDUNDANT may be included in the displayed LUN information. For an ADVANCED USER, the underlying or lower level properties (e.g., RAID level) used to determine the more abstract values may be alternatively included in the displayed LUN information.

As another example, the layer 108 may encapsulate the application-specific object of a storage group object for use in connection with Microsoft® Exchange™. A template included in 104 may be defined for use when provisioning storage for Microsoft® Exchange™ in which a NOVICE user may be asked to provide the following: number of mailboxes and whether to protect the data. Layer 106 may perform a call to layer 108 to provision storage in accordance with the number of mailboxes. In turn, layer 108 may create an EXCHANGE STORAGE GROUP object which includes one or more DATABASE LUN objects and one or more LOG LUN objects. DATABASE LUN objects and LOG LUN objects are described above in connection with the EXCHANGE class.

As another example, the layer 108 may encapsulate the concept of an application neutral mapping as to whether a device including a LUN is "FAST" or "SLOW". A LUN may have a property of being stored on a "FAST" device if the LUN is stored on a device having a set of one characteristics (e.g., if the device is a Fibre-channel device). Otherwise, the device may be characterized as a "SLOW" device. In other words, the layer 108 may be classify a device as FAST or SLOW depending on values of other device properties as may be obtained from layer 110. The use of the FAST and SLOW properties may be introduced in layer 108 as a further abstraction as part of the application and best practices data model. Whether a device is classified as FAST or SLOW may vary with devices on the data storage system. When provisioning storage, the layer 108 may be used to determine what type of device (e.g., FAST or SLOW) along with other properties are best in accordance with the application and/or data storage system. When forming the data set of LUN information displayed to a user, the layer 106 may include the foregoing indicator of FAST or SLOW as a device property associated with each LUN for a NOVICE user that may not have the level of knowledge to know what it means for a device to be fast or slow. However, for an ADVANCED level of user proficiency, the layer 106 may alternatively include the actual values of the properties retrieved from layer 110 used to classify a device as FAST or SLOW. As such, for an ADVANCED proficiency level user, the layer 106 may interact with 110 directly to obtain such values rather than interact with layer 108. This is one example of when layer 106 may interact with layer 108 and/or 110 in accordance with a user proficiency level.

When interacting with layer 108, the layer 106 may retrieve additional LUN information, for example, such as related to the application-specific properties or attributes. This additional information may be displayed if appropriate in accordance with the user proficiency level as described above. Thus, the mapping service layer 106 may perform filtering and selectively present information to the user. An embodiment may also have layer 106 combine one or more properties to present one property or value to the user which may vary in accordance with the user proficiency level. As an example, the layer 106 may retrieve information for each LUN regarding an amount of remaining or available storage from layer 110. For an ADVANCED proficiency level, the layer 106 may include in the data set a value representing the actual amount of remaining storage. For a NOVICE proficiency level, the user may alternatively be presented with an indicator as to whether there is an insufficient amount of storage remaining or available for use on a particular LUN. For the NOVICE user, the layer 106 may make a determination as to whether the amount of remaining storage is less than a threshold amount. If so, the property value of "LOW" may be displayed in connection with unused storage. Otherwise, the property value of "OK" may be displayed. The foregoing value of LOW or OK may be displayed to the NOVICE user as a property value regarding available storage. For ADVANCED users, the value indicating the amount remaining may alternatively be displayed.

As another example, the layer 108 may provide application-specific LUN properties for use in connection with LUNs hosting storage for a database application such as SQL. In an embodiment, an SQL database may have associated therewith storage used for storing the data, a database index, and a database log. In accordance with the foregoing, layer 108 may define an object class of SQL. A LUN of class SQL may also have a property associated therewith as encapsulated in layer 108 indicating whether the LUN is an INDEX LUN (index storage), a LOG LUN (database log storage), or a DATA STORAGE LUN (storage for the user data or database content). Layer 106 may interact with layer 108 to obtain the foregoing additional properties for a LUN used in connection with hosting SQL data. As described above, the layer 106 may perform filtering to decide whether to include the foregoing property information in the LUN table information displayed to the user in accordance with a user proficiency level.

As yet another example, an embodiment may include a template in layer 104 for use in connection with provisioning storage for Microsoft® Exchange™ as follows:

Input: Number of mailboxes, host name, whether data protection or redundancy is desired (YES or NO).

Output: Message indicating status of provisioning operation (e.g., succeed or fail).

Logic: Get user inputs: number of mailboxes, host name, protection desired.

The Input and Output sections indicate inputs and outputs with respect to user interactions. If protection=YES, additional processing may be conditionally performed as appropriate in accordance with a user proficiency level. For example, if a user has ADVANCED proficiency, more detailed information may be obtained in the form of additional user inputs to specify the RAID level, and the like. For the ADVANCED user, the layer 106 may interact with the layer 110 directly rather than through layer 108.

It should be noted that an embodiment may store user preferences related to the UI as part of mapping layer 106. Such user preferences may be communicated to layer 102 in connection with rendering information for display using any one or more different supported presentation technologies.

Figure 3:
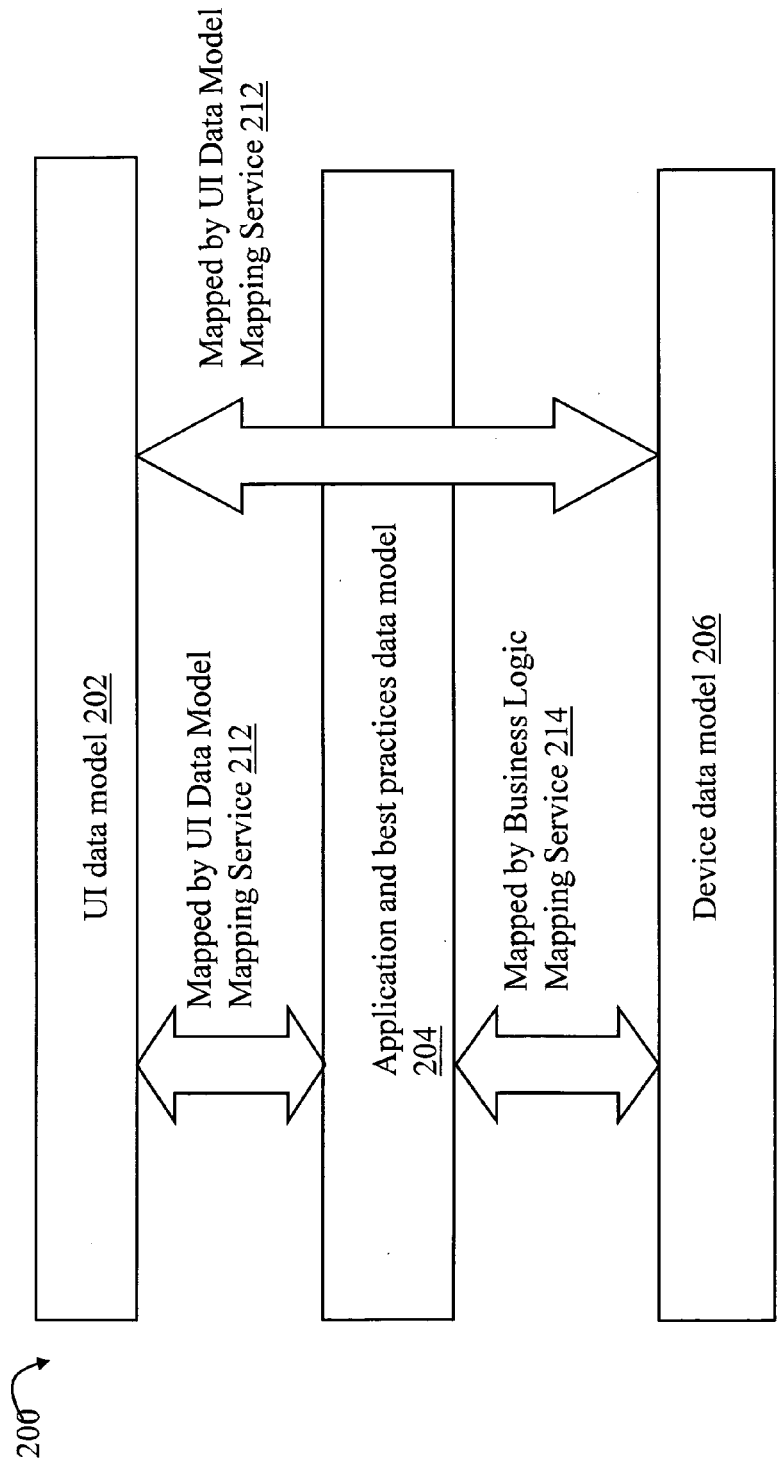
FIG. 3 is an example illustrating the different data model mappings that may be performed in accordance with the techniques herein.

Referring to FIG. 3, shown is an example illustrating the different data model mappings that may be performed in an embodiment in accordance with the techniques herein. The example 200 illustrates that the device data model 206, such as may be used by the layer 110 of FIG. 2, may be mapped by the business logic service layer 214 to the application and best practices data model 204. The application and best practices data model 204 may be mapped to the UI data model 202 by the UI data model mapping service layer 212. The device data model 206 may also be mapped directly to the UI data model 202 by the UI data model mapping service layer 212. The example 200 illustrates the different mappings as may be performed by the different service layers described herein and as illustrated in FIG. 2. As described herein in an embodiment using data models with objects and associated properties or attributes, the data models may include different objects and properties. The objects and properties of a first of the foregoing data models may be mapped to objects and properties of a second of the foregoing data models.

Figure 4:
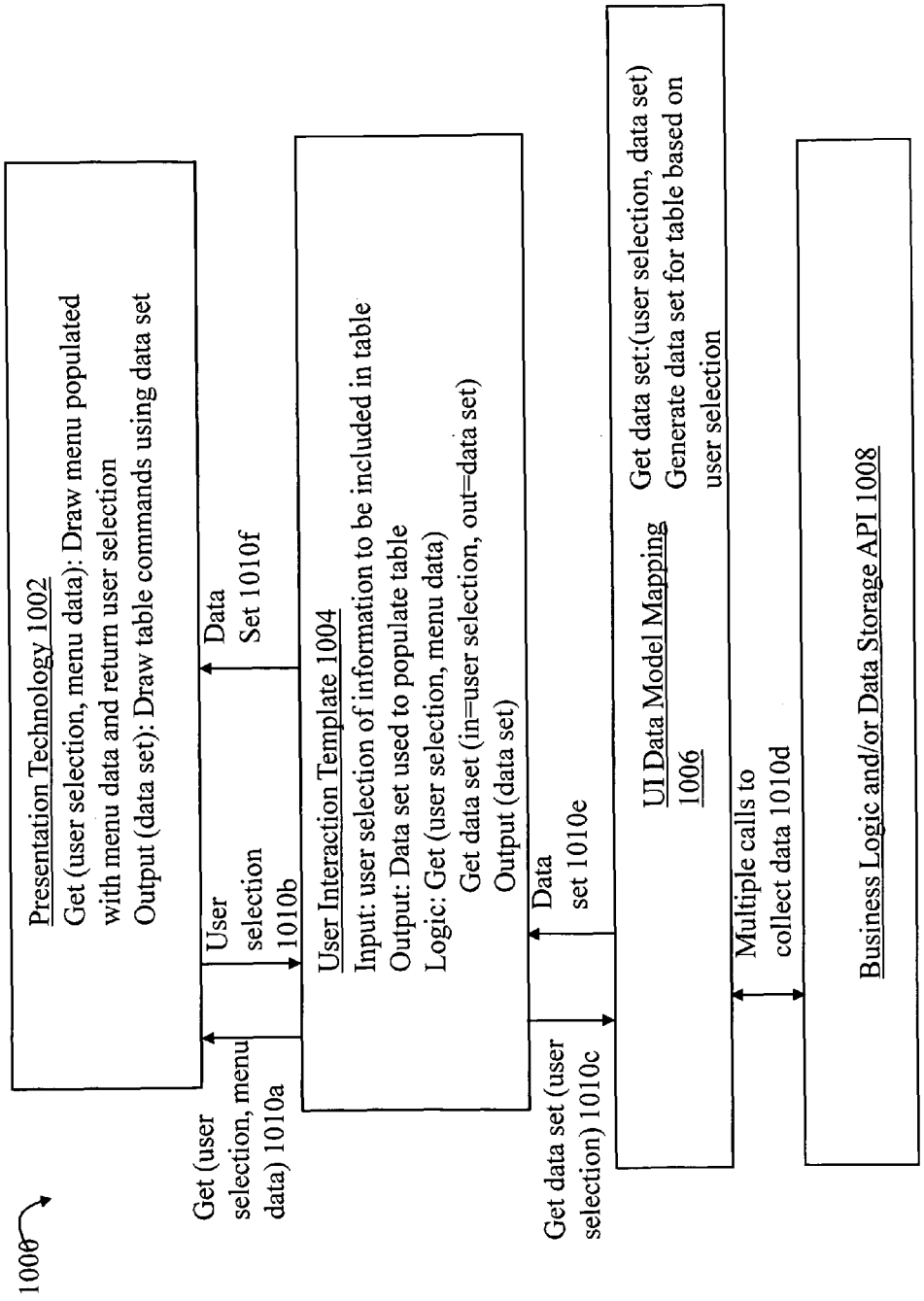
FIGS. 4-7 are illustrations of examples using the different layers in accordance with the techniques herein to perform different data storage system management tasks.
Figure 5:
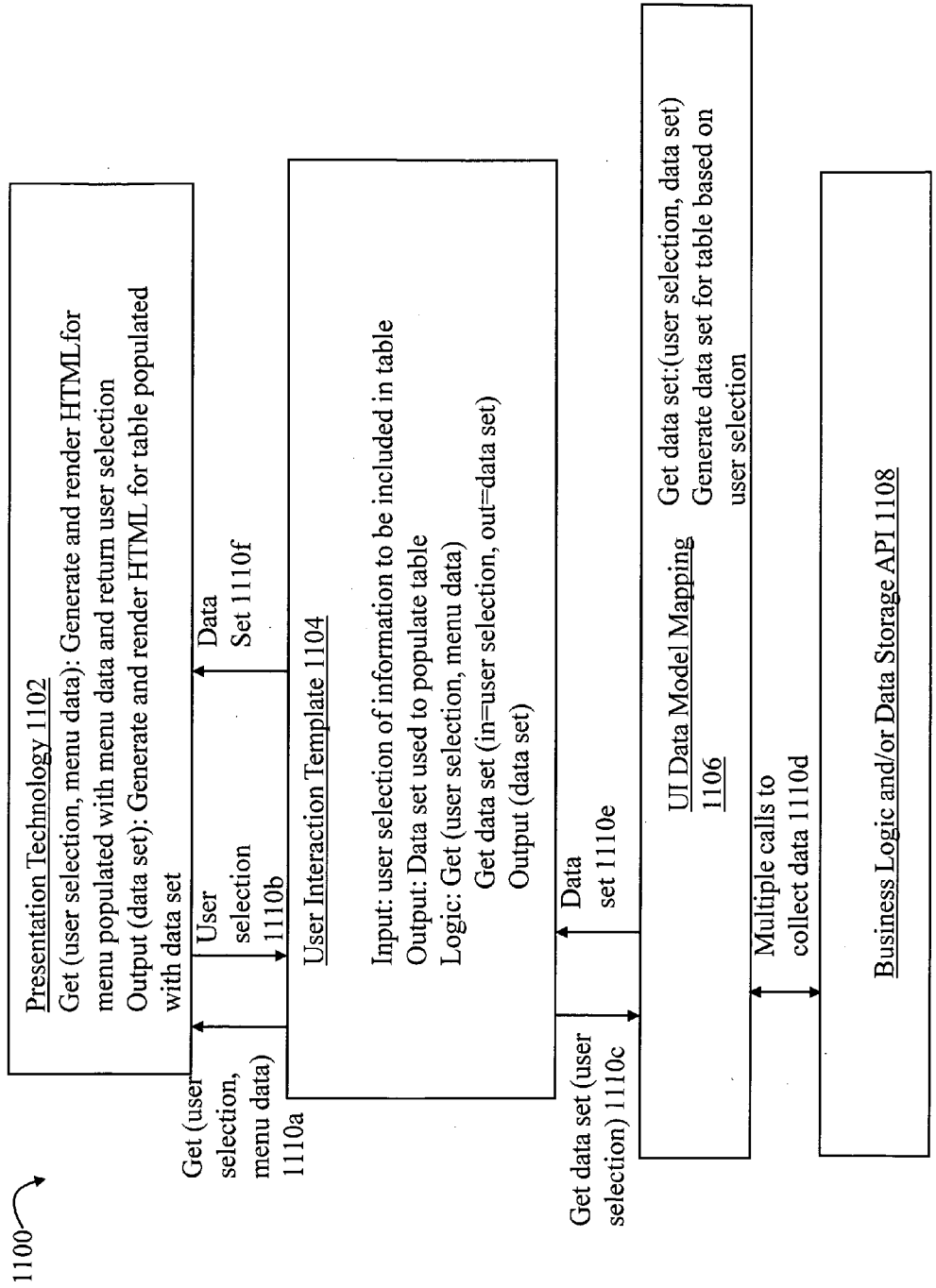
Figure 6:
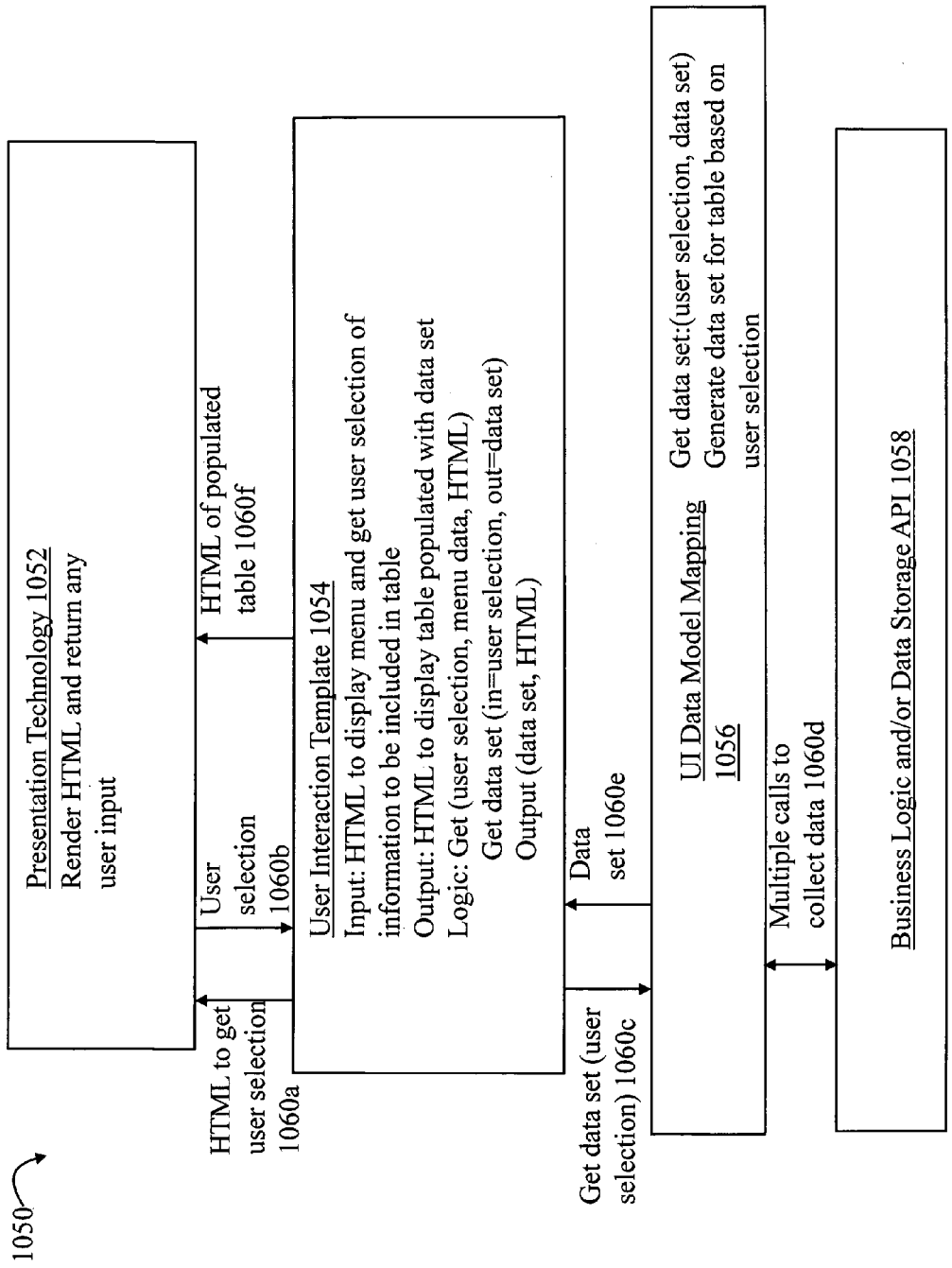

What will now be described are examples further illustrating use of the architecture and framework described herein in connection with performing data storage management tasks. FIGS. 4, 5 and 6 illustrate different ways in which a same task of displaying a table populated with a data set determined in accordance with a user selection may be implemented in an embodiment. FIGS. 4, 5, and 6 illustrate in more detail the example described above in connection with displaying LUN information with different presentation technologies.

Referring to FIG. 4, shown is an example 1000 illustrating use of the techniques herein to display a table populated with a data set. The example 1000 illustrates use of a presentation technology such as FLEX which includes commands to draw or render information. The different service layers are illustrated with additional detail regarding the coded routines that may be invoked in the different layer interactions. It should be noted that element 1008 logically represents the business logic service layer and/or the data storage API service layer as may be invoked by the mapping layer 1006. In this example, one or more menus may be initially populated and displayed to a user as illustrated by data flow arrow 1010*a*. Element 1010*a* illustrates the first call:

Get (user selection, menu data)

in logic of 1004 which is a call to the routine included in layer 1002. The layer 1002 may draw the menu populated with the menu data and return a user selection as indicated by 1010*b*. The second logic step of 1004 may be performed:

Get data set (in=user selection, out=data set)

which is a call to a routine in layer 1006 as illustrated by 1010*c* having an input parameter of user selection and a return or output parameter of the data set. Layer 1006 subsequently collects the data to form the data set by performing multiple calls to the business logic and/or data storage API service layers 1008 as illustrated by arrow 1010*d*. After all the data has been collected by layer 1006 and placed into an appropriate form of the UI data model for display, the layer 1006 returns the data set to the template service layer 1004 as illustrated by arrow 1010*e*. The layer 1004 then performs the last or third step in the logic:

Output (data set)

making a call to the presentation technology service layer 1002 to display the data set. The foregoing is illustrated by arrow 1010*f*.

Referring to FIG. 5, shown is another example illustrating use of the same template from FIG. 4 in connection with a different presentation technology. Additionally, the same UI data model mapping service and business logic and/or data storage API service layers may be used. In other words, code from the example 1000 of FIG. 4 associated with elements 1004, 1006 and 1008 may be reused in connection with the example 1100 of FIG. 5 with a different presentation technology. As such, elements 1104, 1106 and 1108 of FIG. 5 are respectively analogous to elements 1004, 1006 and 1008 of FIG. 4. Similarly, data flow arrows 1110*a*-1110*f* of FIG. 5 are respectively analogous to 1010*a*-1010*f* of FIG. 4. In this example with reference to 1110*f*, the presentation technology service layer 1102 may include code therein which receives as an input the data set and dynamically (e.g., "on the fly") generates the HTML for the table populated with the data set. The layer 1102 may then render the HTML for display such as with a web browser. In this example, the presentation technology used to display the table of information may be a Java applet which generates the HTML for the table in accordance with the data set. In connection with the data flow 1110*a*, the layer 1102 may similarly generate and render the HTML code to display the menu data and obtain the user selection which is returned to the template service layer 1104.

Referring to FIG. 6, shown is another example illustrating use of a variation of the template from FIGS. 4 and 5 in connection with a different presentation technology. Additionally, the same UI data model mapping service layer, business logic service layer and data storage API service layer may be used. In other words, code from the example 1000 of FIG. 4 associated with elements 1006 and 1008 may be reused in connection with the example 1050 of FIG. 6 with a different presentation technology. As such, elements 1056 and 1058 of FIG. 6 are respectively analogous to elements 1006 and 1008 of FIG. 4. Similarly, data flow arrows 1060*a*-1060*f* of FIG. 5 are respectively analogous to 1010*a*-1010*f* of FIG. 4. In this example, the template service layer 1054 may generate the HTML code previously generated by the presentation technology service layer 1102. The HTML code may be sent as illustrated by 1060*b* and 1060*f* to the presentation technology service layer 1052. In this example, the layer 1052 may be a browser which simply renders the HTML. FIG. 6 illustrates a variation of the template 1104 from FIG. 5 and processing that may be performed by the template service layer in an embodiment. FIG. 5 illustrates an example in which the processing to generate the HTML code is performed by the presentation technology service layer. FIG. 6 illustrates an example in which the foregoing processing to generate the HTML code is performed by the user interaction template service layer. Each step in the Logic of 1054 in FIG. 6 may also include the user interaction template 1054 performing processing to generate the HTML prior to interacting with the presentation technology service layer 1052. Thus, each call indicated in the Logic of 1054 may not represent a direct API or interface call into layer 1052 but may rather a call into code of layer 1054 to first perform processing to generate the HTML and then interact with the layer 1052.

Figure 7:
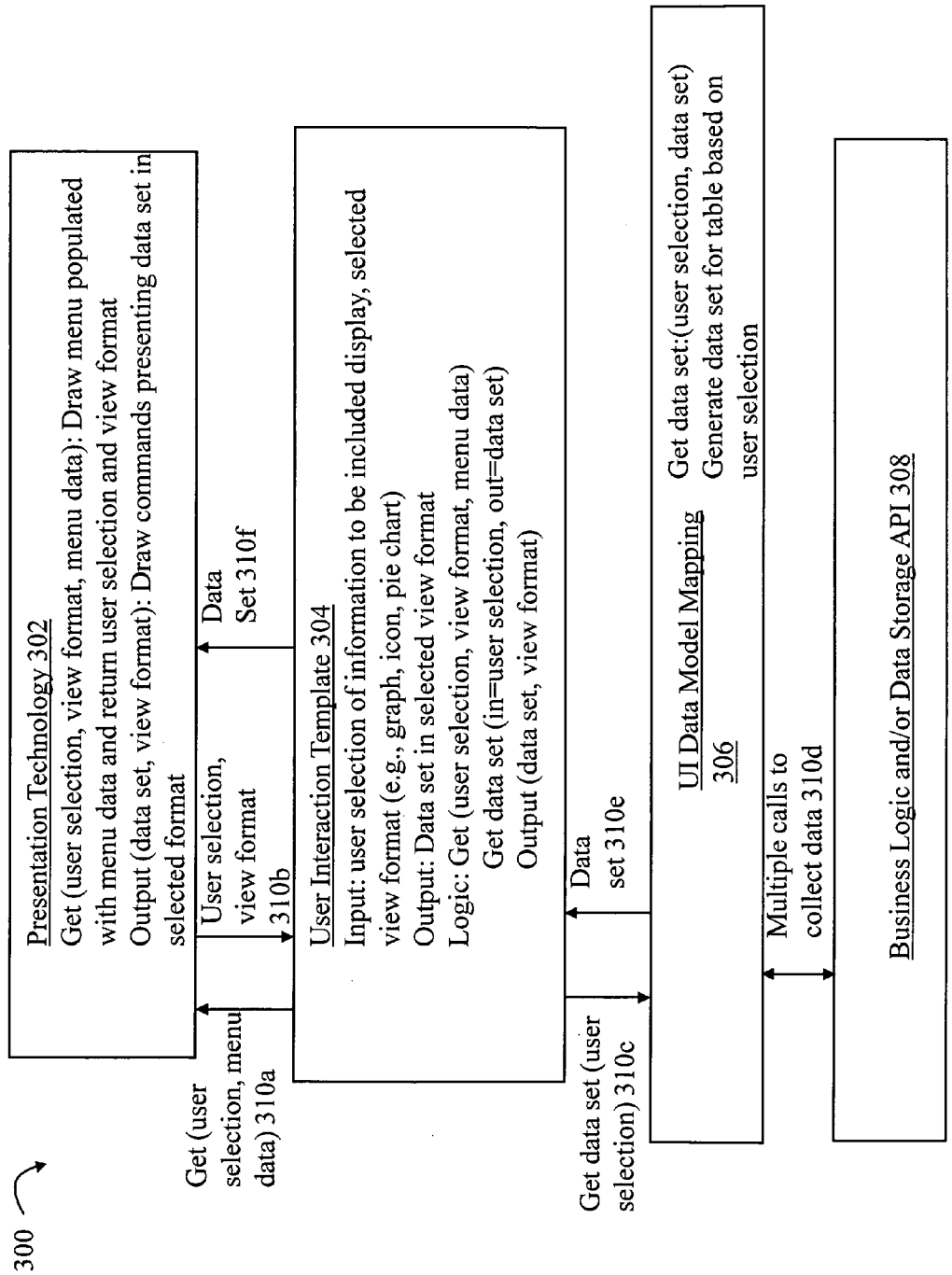

As another example, FIG. 7 illustrates a presentation technology that may be used in connection with displaying data in one of a selected viewing format. The example 300 illustrates use of a presentation technology such as FLEX which includes commands to draw or render information. The different service layers are illustrated with additional detail regarding the coded routines that may be invoked in the different layer interactions. It should be noted that element 308 logically represents the business logic service layer and/or the data storage API service layer as may be invoked by the mapping layer 306. In this example, one or more menus may be initially populated and displayed to a user as illustrated by data flow arrow 310*a*. Element 310*a* illustrates the first call:

Get (user selection, view format, menu data)

in the logic of 304 which is a call to the routine included in layer 302. The layer 302 may draw the menu populated with the menu data and return a user selection as to the data to be displayed in a selected view format. In this example, the view format may present the data in different forms such as a graph, pie chart, list of icons, and the like. The user may select the particular format in which the data set is displayed. The user selection and view format are returned as indicated by 310*b*. The second logic step of 304 may be performed:

Get data set (in=user selection, out=data set)

which is a call to a routine in layer 306 as illustrated by 310*c* having an input parameter of user selection and a return or output parameter of the data set. Layer 306 subsequently collects the data to form the data set by performing multiple calls to the business logic and/or data storage API service layers 308 as illustrated by arrow 310*d*. After all the data has been collected by layer 306 and placed into an appropriate form of the UI data model for display, the layer 306 returns the data set to the template service layer 304 as illustrated by arrow 310*e*. The layer 304 then performs the last or third step in the logic:

Output (data set, view format)

making a call to the presentation technology service layer 302 to display the data set in the selected view format. The foregoing is illustrated by arrow 310*f*.

What will now be illustrated are various ways in which an embodiment may deploy the different service layers described herein. The service layers of FIG. 2 may be remotable and can be deployed alone or in combination with other layers on a workstation (e.g., such as 16 of FIG. 1), server computer system, and/or managed device (e.g., such as a data storage system).

Figure 8:
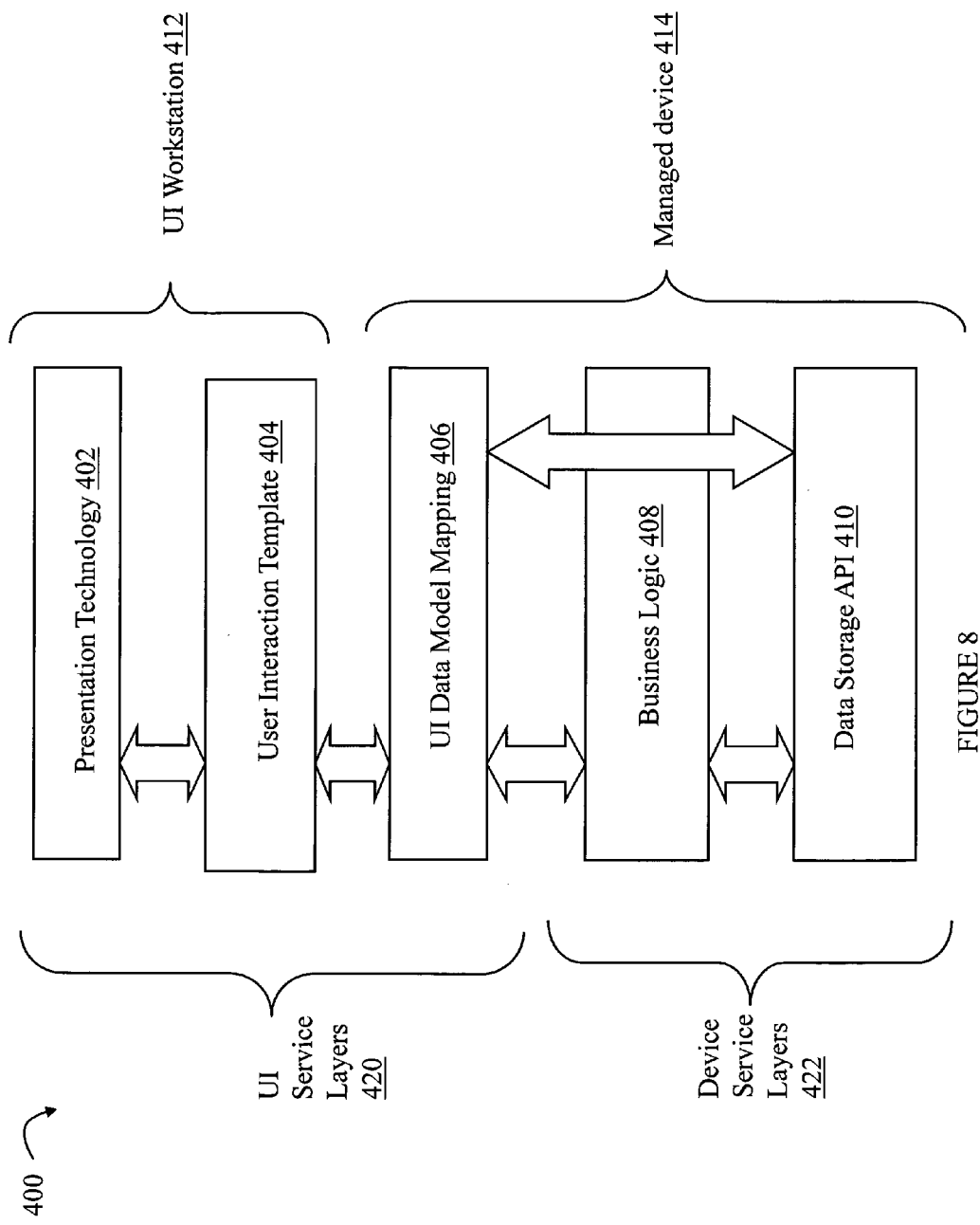
FIGS. 8-11 are examples illustrating various configurations of the different service layers on different components as may be included in an embodiment.

Referring to FIG. 8, shown is a first example illustrating a configuration of the different layers on different components as may be included in an embodiment. The layers 402 and 404 may be included on a UI workstation 412, such as the workstation 16 of FIG. 1. The remaining layers 406, 408 and 410 may be included in a managed device 414, such as a data storage system.

Figure 9:
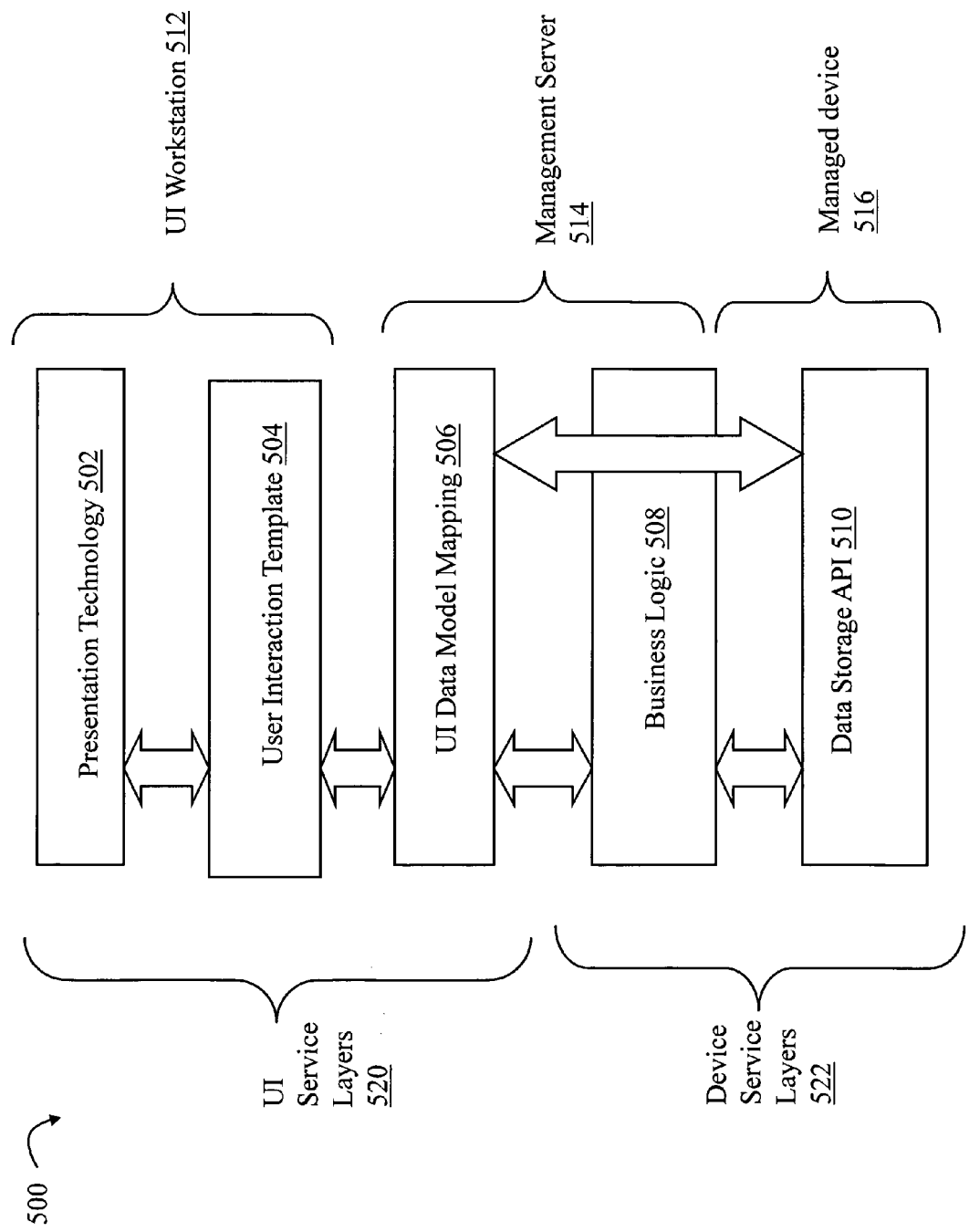

Referring to FIG. 9, shown is a second example illustrating a configuration of the different layers on different components as may be included in an embodiment. The layers 502, and 504 may be included on a UI workstation 512, such as the workstation 16 of FIG. 1. Layers 506 and 508 may be included on a management server system 514 which may provide connections to many different managed devices 516. The remaining layer 510 may be included on each managed device 516, such as a data storage system.

Figure 10:
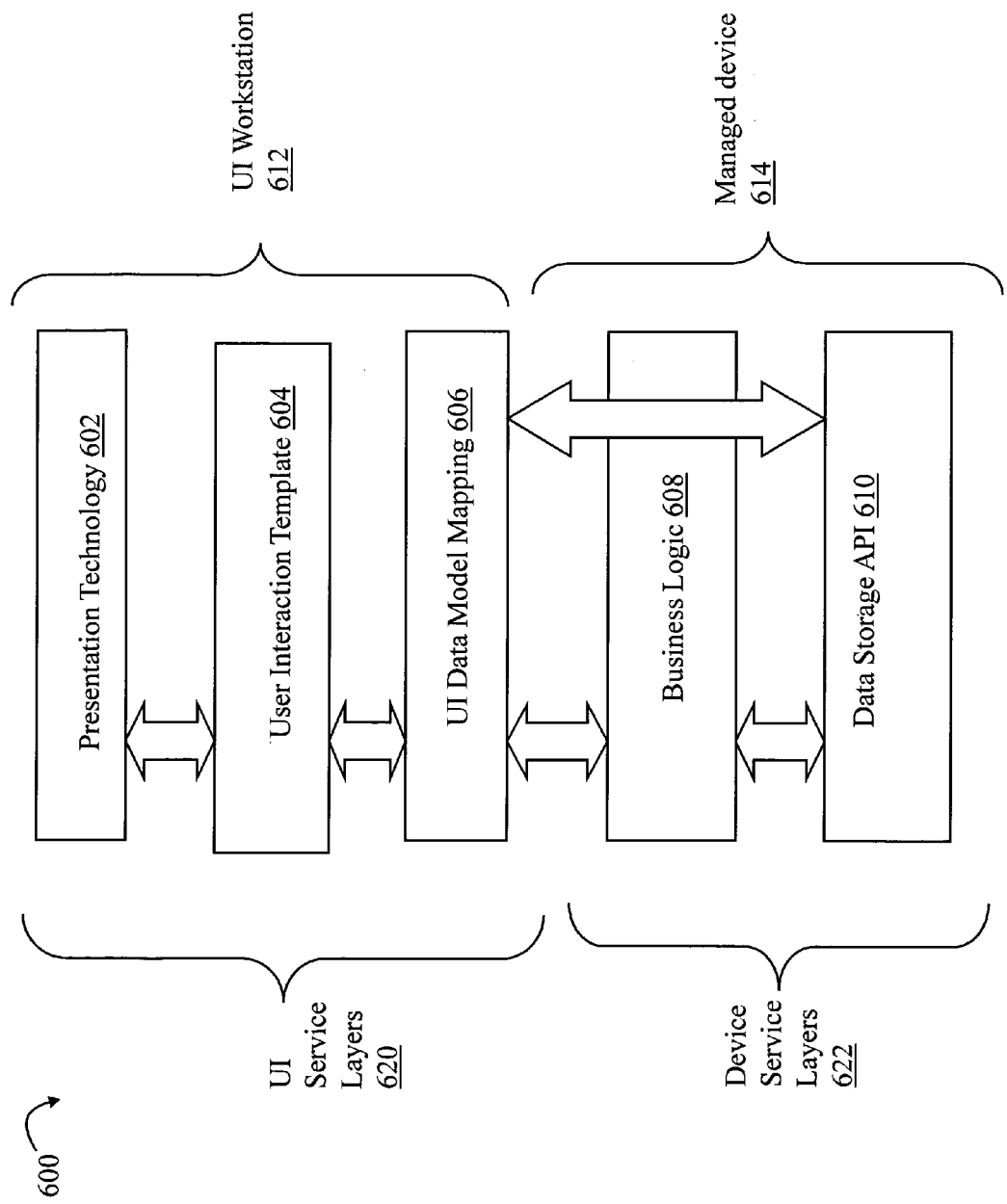

Referring to FIG. 10, shown is a third example illustrating a configuration of the different layers on different components as may be included in an embodiment. The layers 602, 604 and 606 may be included on a UI workstation 612, such as the workstation 16 of FIG. 1. The remaining layers 608 and 610 may be included in a managed device 614, such as a data storage system.

Figure 11:
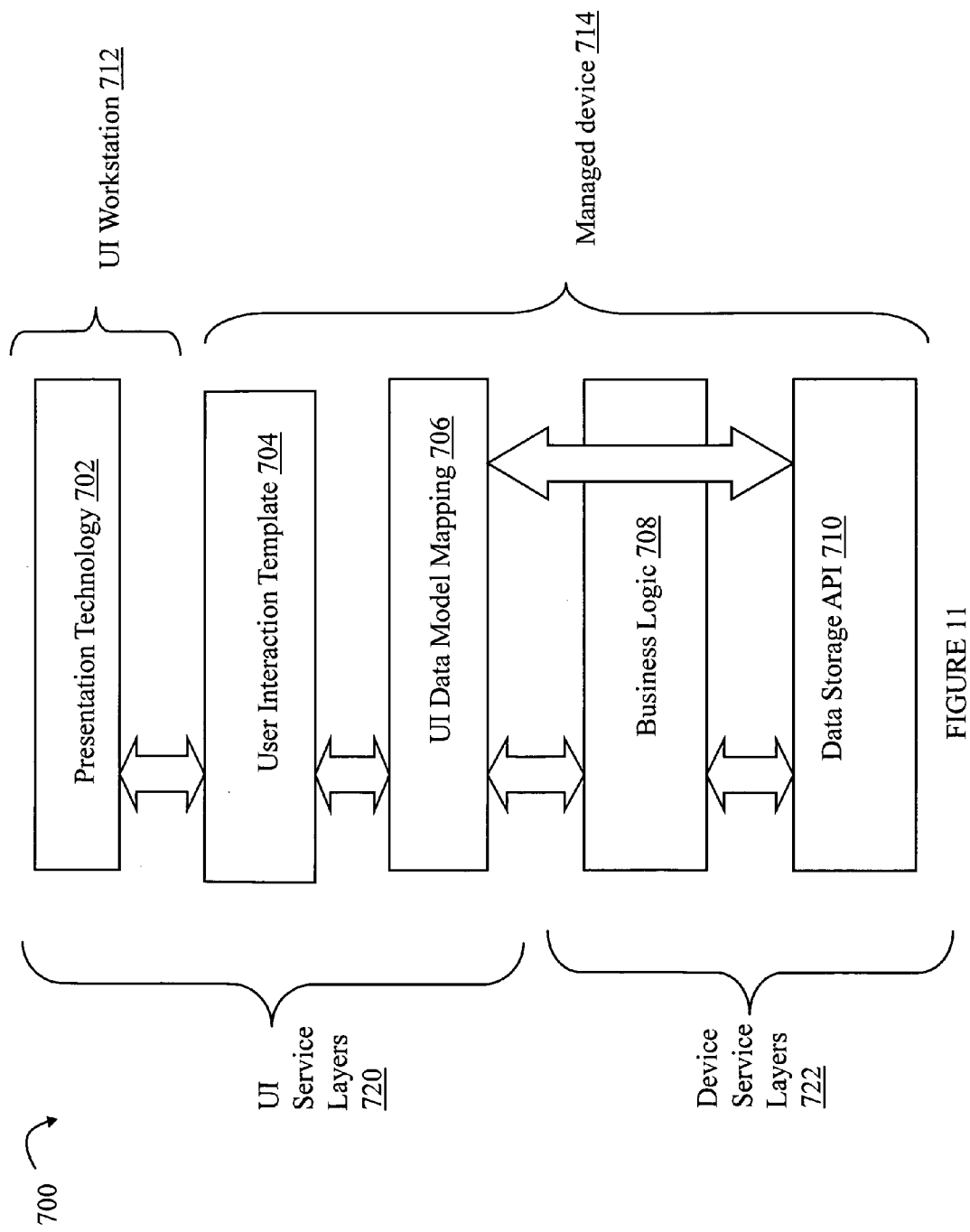

Referring to FIG. 11, shown is a fourth example illustrating a configuration of the different layers on different components as may be included in an embodiment. The layer 702 may be included on a UI workstation 712, such as the workstation 16 of FIG. 1. The remaining layers 704, 706, 708 and 710 may be included in a managed device 714, such as a data storage system.

Using the techniques herein, a system and service layers of code modules may be developed and used in connection with performing a data storage management task.

An embodiment may implement the techniques herein using code executed by a computer processor. For example, an embodiment may implement the techniques herein using the rules, rules engines, and the like, using code which is executed by a processor of the data storage system. As will be appreciated by those skilled in the art, the code may be stored on the data storage system on any one of a computer-readable medium having any one of a variety of different forms including volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, (DVD) or other optical storage, magnetic cassettes, magnetic tape, magnetic disk storage or other magnetic storage devices, or any other medium which can be used to store the desired information and which can accessed by a data storage system processor or processor on another system in accordance with the techniques herein.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A system including a non-transitory computer readable medium with executable code stored thereon for performing a data storage management task, the non-transitory computer readable medium comprising executable code for:

a presentation technology service layer that renders a user interface for user interaction in accordance with one or more rendering techniques;

a user interaction template service layer that includes one or more templates, each of said templates describing processing to perform said data storage management task;

a user interface data model mapping service layer which communicates with at least one of a business logic service layer and a data storage interface layer to perform one or more operations in connection with said data storage management task and map data received therefrom in a form for use by said user interface in accordance with a user interface data model, wherein said user interface data model mapping service layer generates a data set and communicates with said business logic service layer to retrieve said data set if user interactions are in accordance with a first proficiency level, and said user interface data model mapping service layer communicates directly with said data storage interface layer to retrieve said data set if user interactions are in accordance with a second proficiency level, wherein said second proficiency level is associated with a higher degree of knowledge regarding data storage system management than said first proficiency level and processing a request received by the user interface when interacting at the first proficiency level to provision storage, where said request includes a number of mailboxes for an electronic mail application and an indication of whether to protect data, said processing including:

performing a call from the user interface data model mapping service layer to the business logic service layer to provision storage for the request, wherein said business logic service layer encapsulates application-specific classes of objects including a storage group object and application-specific properties for said electronic mail application; and creating, by said business logic service layer in response to said call, said storage group object including a plurality of logical storage device objects representing corresponding logical storage devices, each of said logical storage device objects representing one of the corresponding logical storage devices and including an application-specific property for the electronic mail application denoting whether said one logical storage device is a database logical storage device for storing data or a log storage device for logging.

2. The system of claim 1, wherein each of said templates includes one or more user-specified inputs, one or more outputs rendered by one of said rendering techniques, and outlines one or more logical steps to perform said data storage management task.

3. The system of claim 2, wherein each of the one or more logical steps corresponds to a user interaction and an ordering associated with performing the one or more logical steps defines an ordering in which user interactions associated with the logical steps are performed.

4. The system of claim 1, wherein said user interaction template service layer includes calls to code in said presentation technology service layer to render data for display in a user interface, and wherein said user interaction template service layer includes calls to code in said user interface data model mapping service layer.

5. The system of claim 4, wherein said user interaction template service layer includes at least one call to code in said user interface data model mapping service layer to perform processing or retrieve data in connection with said data storage management task.

6. The system of claim 1, wherein said data storage interface layer uses a data storage data model and said business logic service layer maps data elements from the data storage data model to an application and practices data model customized for a particular application and a particular data storage system and environment.

7. The system of claim 6, wherein said business logic service layer performs mapping of one or more data elements from said data storage data model to another data element in said application and practices model to perform said data storage management task in accordance with practices associated with a particular application and data storage system upon which data is hosted for said particular application.

8. The system of claim 1, wherein said business logic service layer includes an application-neutral data element which is associated storage for each of a plurality of applications for which storage is hosted on a data storage system.

9. The system of claim 8, wherein said application-neutral data element is a data object or a property of a data object associated with storage hosted on said data storage system for each of a plurality of applications for which storage is hosted on the data storage system.

10. The system of claim 1, wherein said user interface data model mapping service layer generates the data set in accordance with said user interface data model which varies in accordance with a user proficiency level at which said user interactions are performed.

11. The system of claim 1, wherein said data storage management task is to display a data set of information, said presentation technology service layer including code for rendering said data set in accordance with at least two different rendering techniques, said user interaction template service layer including a template for displaying the set of information, and wherein said template is used in connection with rendering said data set in connection with said user interface for each of said two different rendering techniques.

12. The system of claim 1, wherein said presentation technology service layer and said user interaction template service layer are included in a workstation and said user interface data model mapping service layer and said data storage interface layer are included in a data storage system, said workstation communicating directly with said managed device.

13. The system of claim 1, wherein said presentation technology service layer and said user interaction template service layer are included in workstation and said user interface data model mapping service layer is included in a management server and said data storage interface layer is included in a data storage system, said workstation communicating directly with said management server, and said management server communicating directly with said
    data storage system and one or more other managed devices each including another instance of said data storage interface layer.

14. The system of claim 1, wherein said presentation technology service layer, said user interaction template service layer, and said user interface data model mapping service layer are included in a workstation and said data storage interface layer is included in a data storage system, said workstation communicating directly with said data storage system.

15. The system of claim 1, wherein said presentation technology service layer is included in a workstation, and said user interaction template service layer, said user interface data model mapping service layer and data storage interface layer are included in a data storage system, said workstation communicating directly with said data storage system.

16. A computer-implemented method for performing a data storage management task comprising:
    executing first code included in a presentation technology service layer that renders a user interface for user interaction in accordance with one or more rendering techniques;
    executing second code included in a user interaction template service layer that includes one or more templates, each of said templates describing processing to perform said data storage management task;
    executing third code included in a user interface data model mapping service layer which communicates with at least one of a business logic service layer and a data storage interface layer to perform one or more operations in connection with said data storage management task and map data received therefrom in a form for use by said user interface in accordance with a user interface data model, wherein said user interface data model mapping service layer generates a data set and communicates with said business logic service layer to retrieve said data set if user interactions are in accordance with a first proficiency level, and said user interface data model mapping service layer communicates directly with said data storage interface layer to retrieve said data set if user interactions are in accordance with a second proficiency level, wherein said second proficiency level is associated with a higher degree of knowledge regarding data storage system management than said first proficiency level; and
    processing a request received by the user interface when interacting at the first proficiency level to provision storage, where said request includes a number of mailboxes for an electronic mail application and an indication of whether to protect data, said processing including:
    performing a call from the user interface data model mapping service layer to the business logic service layer to provision storage for the request, wherein said business logic service layer encapsulates application-specific classes of objects including a storage group object and application-specific properties for said electronic mail application; and
    creating, by said business logic service layer in response to said call, said storage group object including a plurality of logical storage device objects representing corresponding logical storage devices, each of said logical storage device objects representing one of the corresponding logical storage devices and including an application-specific property for the electronic mail application denoting whether said one logical storage device is a database logical storage device for storing data or a log storage device for logging.

17. The method of claim 16, wherein each of said templates includes one or more user-specified inputs, one or more outputs rendered by one of said rendering techniques, and outlines one or more logical steps to perform said data storage management task, and wherein each of the one or more logical steps corresponds to a user interaction and an ordering associated with performing the one or more logical steps defines an ordering in which user interactions associated with the logical steps are performed.

* * * * *